United States Patent

[11] 3,593,736

| [72] | Inventor | Albert H. White<br>Wethersfield, Conn. |
|---|---|---|
| [21] | Appl. No. | 825,818 |
| [22] | Filed | May 19, 1969 |
| [45] | Patented | July 20, 1971 |
| [73] | Assignee | Chandler Evans Inc.<br>West Hartford, Conn. |

[54] SLUG PUMP AND PRESSURIZING VALVE FOR FUEL CONTROL SYSTEM
13 Claims, 3 Drawing Figs.

| [52] | U.S. Cl. | 137/110, 60/39.14 |
|---|---|---|
| [51] | Int. Cl. | F02c 7/26, F02c 9/04 |
| [50] | Field of Search | 103/40; 137/110, 112, 113; 60/39.14, 39.28 |

[56] References Cited
UNITED STATES PATENTS

| 2,640,318 | 6/1953 | Carey | 60/39.14 |
|---|---|---|---|
| 2,670,033 | 2/1954 | Ray | 60/39.14 X |
| 3,019,603 | 2/1962 | Kreutzer | 60/39.14 X |
| 3,360,199 | 12/1967 | Sharpe | 60/39.28 X |

*Primary Examiner*—Robert G. Nilson
*Attorney*—Radford W. Luther

ABSTRACT: A slug pump and pressurizing valve are fluidly interconnected in a starting circuit of a fuel control system for a gas turbine engine. The pressurizing valve fluidly interconnects two segments of the main fuel supply line for providing a regulated pressure in one of the segments. The slug pump is used in the starting operation to expel a volume of fuel contained within the pump and thus momentarily propel a burst of fuel to the engine. The slug pump includes a chamber and either a piston or a diaphragm to expel the fuel. The pressurizing valve has tow springs which bias a piston, the face of which is exposed to the segment of the main fuel supply line in which the fuel pressure is to be regulated. One spring always biases the piston, while the other spring biases the piston only after the piston moves to a predetermined position. When a predetermined pressure is applied to the exposed face of the piston by the main fuel pump, the piston moves upwardly to close off the starting circuit. After a sufficient pressure is applied to the exposed face, the other spring causes the pressure adjacent the exposed face to be regulated.

INVENTOR
ALBERT H. WHITE
BY Radford W. Luther
ATTORNEY

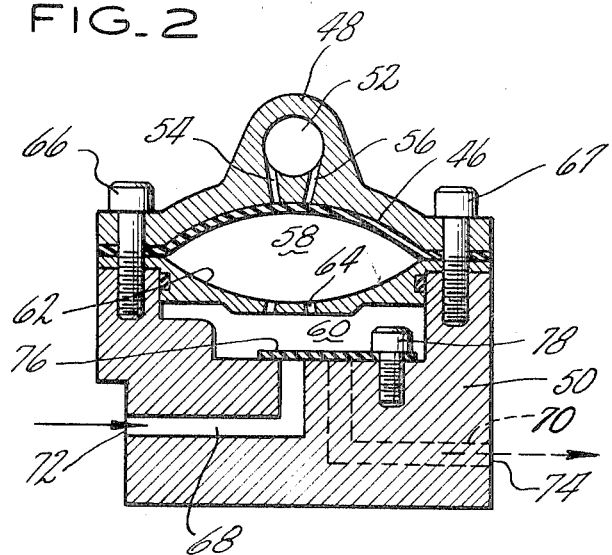
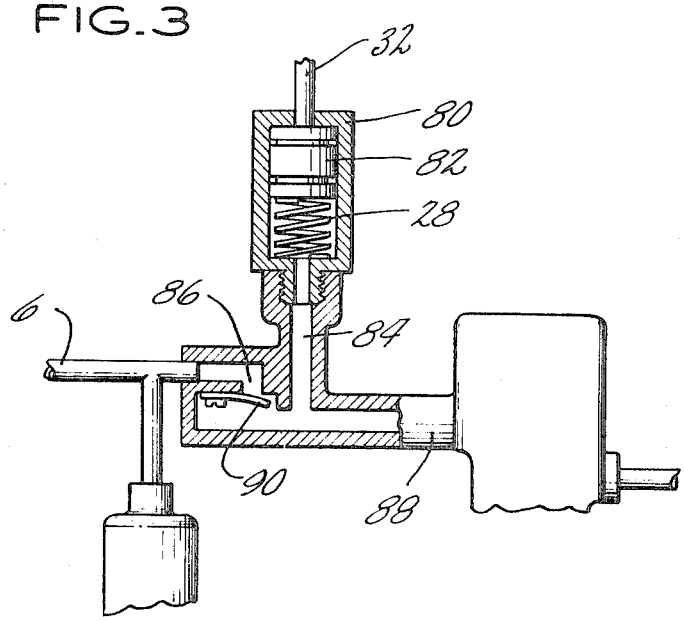

SLUG PUMP AND PRESSURIZING VALVE FOR FUEL CONTROL SYSTEM

BACKGROUND OF THE INVENTION

This invention primarily relates to fuel control systems, and more particularly to fuel control systems for gas turbine engines, and even more particularly to the starting circuits of fuel control systems. This invention also relates to fluid accumulators and pressurizing valves.

In fuel control systems, the primary factor which is determinative of the size of the main fuel pump is the starting flow requirement. Since the flow capacity of a pump is dependent upon the discharge pressure thereof, a fuel control system in which the starting flow requirement and the pump discharge pressure are minimal, will permit the inclusion of a pump therein, which is smaller than that which would ordinarily be required, and thus contribute to an overall reduction in the system's weight, volume and power needs.

It is also advantageous under certain circumstances to utilize a small pump in a fuel control system to render unnecessary the provision of a device to cool the fuel. A case in point is a fuel control for an aircraft gas turbine engine. High altitude or cold weather operations may require 100 percent engine speed and a significantly reduced fuel flow. As the engine-driven fuel pump delivers an excessive quantity of fuel, it is necessary to bypass this fuel to a point upstream of the pump. This bypass operation occasions a rise in fuel temperature that could, depending on the system's characteristics, make the incorporation of a fuel-cooling device a necessity. Also, fuel temperatures in the heretofore-discussed system may approach a level which causes cavitation of the fuel. Installation of a boost pump, to raise fuel pressure and thereby forestall cavitation, may then be unavoidable.

Pressurizing valves in fuel control systems are normally located downstream of the system's metering section. Frequently the flow passing through such valves engenders a pulsation in the valves (valve chatter) which, of course, effects coexistent pressure fluctuations in the flow issuing therefrom. These pressure fluctuations may cause a deterioration in engine performance if they are not damped before the flow enters the burner.

SUMMARY OF THE INVENTION

This invention is directed to a novel means to reduce the size and complexity of a fuel control system wherein the means entails a relatively simple structure. A slug pump and a pressurizing valve are in series connection in a starting circuit. The starting circuit fluidly communicates fuel upstream of the main engine-driven fuel pump (the gear pump 2 in Figure 1) to a main fuel supply line downstream of the system's metering section. The pressurizing valve is associated with the main fuel supply line upstream of the fuel-metering section of the fuel control system. The novel location and construction of the pressurizing valve not only serves to minimize the back pressure on the pump, but also tends to reduce pressure fluctuations in the flow emitted from the control system, since the flow must pass through a metering section, which acts to damp these fluctuations, before it emerges from the control system.

The slug pump of the invention directs a burst of fuel from a chamber located therein which initiates a surge in the fuel flow downstream of the pump, the flow being substantially unobstructed by the pressurizing valve. The slug pump of the invention is extremely useful when employed in conjunction with a gas turbine engine, the burner of which is capable of being fired at a low or zero engine speed, since the flow rate produced by a boost pump alone may be insufficient to obtain a burner light.

The novel arrangement in the starting circuit not only enables the boost pump to fill the lines of the system without hindrance from the pressurizing valve, but also encompasses a feature which allows the pressurizing valve to close off the starting circuits after the engine-driven main fuel pump has created a pressure in the main fuel supply line which is a predetermined amount over the boost pressure.

The pressurizing valve of the invention can be considered as operating in three basic stages. In the first stage of operation when the pressure $P_R$ exposed to the valve exceeds the boost pressure $P_B$ by a specific amount, the valve piston begins to move upwardly to close off the starting circuit. During this upward movement, the piston is biased by a helical compression spring. The second stage of operation occurs as the pressure differential $P_R-P_B$ approaches a higher valve. In this stage of operation, the piston is biased by another helical compression spring, in addition to the aforementioned spring, which causes the pressurizing valve to commence regulating the pressure $P_R-P_B$. The third stage of operation begins when conditions downstream effect a pressure $P_R$ above that which the pressurizing valve is designed to regulate. In this area of operation the pressurizing valve is wholly ineffective.

Accordingly, it is a primary object of this invention to provide a starting circuit for a fuel control system that will tend to reduce the starting flow requirements and the discharge pressure on the main fuel pump of the system and hence permit the utilization of a relatively small main fuel pump.

Another object is to provide in a fuel control for a gas turbine engine, a means to inject a burst of fuel into the burner of the engine at or near zero engine speed.

Yet another object is to provide a pressurizing valve in a fuel control system which will not significantly hinder the starting flow therein.

A further object is to provide a fuel control system in which the pressure fluctuations in the fuel flow, caused by the pressurizing valve are somewhat attenuated before the flow leaves the system.

A still further object is to provide a pressurizing valve for a fuel control system that is capable of closing the starting circuit thereof, as well as regulating the pressure in the main fuel supply line therein.

These and other objects, features and advantages of the invention will become apparent upon reference to the succeeding detailed description thereof, and to the drawings illustrating the preferred embodiments thereof.

BRIEF DESCRIPTION OF THE DRAWINGS

FIG. 2 is a sectional view of another embodiment of the slug pump of the invention.

FIG. 3 is a schematic view of yet another embodiment of the slug pump of the invention.

DETAILED DESCRIPTION OF THE PREFERRED EMBODIMENTS

Figure 1:
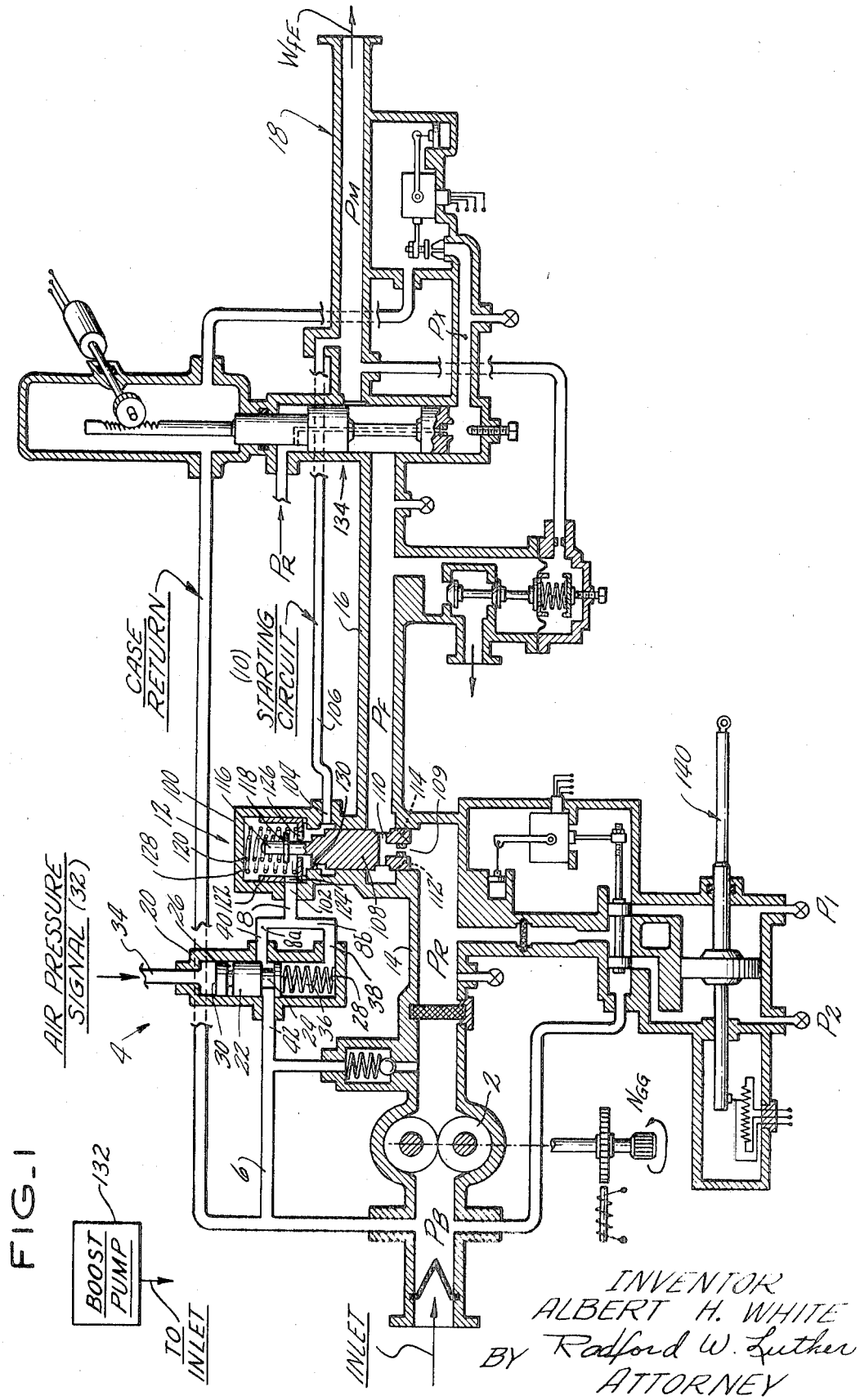
FIG. 1 is a schematic diagram of a fuel control system for a gas turbine engine with adjustable power turbine nozzles which embodies a slug pump and a pressurizing valve of the invention.

Referring now to the drawings wherein like reference characters are used throughout to designate like elements, and more specifically to FIG. 1 there is shown a schematic diagram of a fuel control system for a gas turbine engine with adjustable power turbine nozzles, which includes a slug pump and a pressurizing valve according to the invention. The details of construction and operation of the particular fuel control system and the particular nozzle control shown, together with other associated control devices, not shown, are fully shown and described in my copending applications, U.S. Ser. Nos. 825,548 and 825,857, filed on an even date herewith, entitled respectively "Main Fuel Metering Valve" and "Hybrid Fuel Control." They are repeated here to the extent necessary for a complete understanding of the slug pump and pressurizing valve of this invention.

A slug pump, generally indicated at 4, is shown fluidly interconnecting an inlet segment or conduit 6 and an interconnecting segment or conduit 8 of a starting circuit 10. A pressurizing valve, generally indicated at 12, fluidly interconnects segments or conduits 14 and 16 of a main fuel supply line, generally designated at 18. It will be noted that a fuel flow in starting circuit 10 is not hindered by the pressurizing valve, except insofar as its passage therethrough is impeded by the inherent resistance of the upper structure of the pressurizing valve 12 and the closure of the outlet port thereof by a piston disposed therein, the operation of which will be more fully explained hereinafter. Also, FIG. 1 shows that the pressurizing valve restricts fuel flow between segments 14 and 16 of main fuel supply line 18.

The slug pump 4 is formed by outer casing 20 and a piston 22 with two spaced annuli 24 and 26 formed therein. Piston 22 is biased by a helical compression spring 28. The upper face 30 of piston 22 is exposed to an air pressure signal 32, adapted to be ducted from a pneumatic source (not shown) by pneumatic line 34 to drive the piston 22 against the spring 28 and expel the accumulated fuel in chamber 36 through interconnecting segment 8. Conduit 8 comprises tow branches 8a and 8b which respectively communicate with outlet ports 38 and 40 of housing 20. In the piston position, illustrated in FIG. 1, inlet conduit 6, inlet port 42, and the outlet ports 38 and 40 are placed in fluid intercommunication by virtue of the branches 8a and 8b and the annulus 24.

When an air signal is passed through the line 34, piston 22 will be driven downwardly expelling the fuel accumulated in the chamber 36 through the outlet port 38 to conduit 8 via branch 8b. As the piston moves downwardly towards its lower limit of travel, the land between the annuli 24 and 26 will act as a check valve and block a return flow through the outlet port 40. When the piston has reached its lower limit of travel, annulus 26 will again place conduits 6 and 8 in fluid communication. This annulus 26 will also prevent pressure from building up in conduit 8 and the upper portion of the pressurizing valve when the pressurizing valve's outlet port is closed off by an increase in the pressure $P_R$.

The slug pump of the invention may assume various alternative forms, as illustrated in FIGS. 2 and 3. FIG. 2 shows a slug pump 44 which employs a rubber diaphragm 46 instead of a piston. The casing of the slug pump of FIG. 2 is formed by an upper portion 48 and a lower portion 50. Portion 48 contains a pneumatic passage 52 which communicates with the upper surface of the diaphragm 46 by means of bores, only two of which are shown and designated 54 and 56. The upper and lower portions of the casing form a chamber which comprises two sections 58 and 60 divided by a contoured cushion structure 62 which is formed with a number of centrally located bores 64 passing therethrough. The purpose of structure 62 is to substantially eliminate deformation of the diaphragm upon downward movement thereof. The diaphragm and the cushion are fixedly secured to the casing by bolts 66 and 67 which also interconnect the upper and lower portions 48 and 50. Lower portion 50 contains an inlet passage or conduit 68 and an outlet passage or conduit 70 which are adapted to be connected to conduits 6 and 8 respectively at their inlet and outlet ports 72 and 74. A flapper valve 76 is secured to lower portion 50 by bolt 78 for preventing flow through conduit when an air signal is delivered to diaphragm 46. The flapper valve is made of a sheet of rubber or other suitable synthetic material and covers the outlet of passage 68 in chamber 60. The passage 70 communicates directly with chamber 60 and is not covered by the flapper valve 76. When an air signal is received by the diaphragm 46, the accumulated fuel in chamber 58 will be expelled into chamber 60 thereby momentarily increasing the flow in passage 70. The flapper valve 76 simultaneously checks a return flow in passage 68.

FIG. 3 shows another embodiment of the slug pump which includes certain features from the two previously discussed embodiments. A casing 80, houses a piston 82 mounted for axial sliding movement therein. A helical compression spring 28 biases the piston as in the embodiment of FIG. 1. Chamber 84 is in direct fluid communication with inlet conduit 6 and the pressurizing valve by means of respective inlet and outlet ports 86 and 88. A flapper valve or check valve 90 is mounted adjacent inlet port 86 to prevent a return flow therethrough when piston 82 is displaced by air pressure signal 32. In its preferred form, flapper valve 90 contains a small hole to relieve any pressure occasioned by the closing of the outlet port 104 of the pressurizing valve, as previously explained with reference to the embodiment of FIG. 1.

Referring again to FIG. 1, the pressurizing valve 12 includes a housing 100 and inlet and outlet ports 102 and 104 which respectively communicate with the interconnecting segment 8 and an outlet segment or conduit 106 of the starting circuit 10. A piston 108, with an exposed face 109, is mounted for axial sliding movement within housing 100. The piston 108 includes a passage 110, containing a restriction therein, which serves to fluidly communicate main fuel supply line segments 14 and 16. The lower portion of piston 108 includes at least two notches 112 and 114 adjacent face 109 which permit further restricted fluid communication between the segments 14 and 16 as the piston is displaced slightly from its lower limit. These notches function to allow a gradual rise in pressure $P_R$ with an increase in fuel flow in the main fuel supply line. After a sufficient pressure differential, $P_R-P_B$ has been achieved, these notches begin to place segments 14 and 16 in further fluid communication.

The upper portion of piston 108 comprises a spool 116 with an abutment 118 integral therewith. A helical compression spring 120 contacts the abutment to urge the piston downwardly in housing 100. The upper portion of housing 100 also contains a slideable member 122 which has two holes 124 and 126 formed therein, which place starting circuit segments 8 and 106 in fluid communication. Member 122 is also urged downwardly, as is the aforementioned abutment, by another helical compression spring 128. The piston 108 embodies a lateral projection 130 that is adapted to contact the member 122 after the piston has moved upwardly a sufficient distance. When projection 130 and member 122 are in contact, the pressurizing valve will act to regulate the pressure $P_R$. Also during this contact, the upward movement of the piston must overcome the bias of both of the helical compression springs.

In operation when the gear pump 2 (main engine-driven fuel pump) of FIG. 1 is at rest, fuel from a boost pump 132 will be injected into the starting circuit 10. It will be noted that the gear pump acts as a check valve when the gears thereof are not turning. The burner of the gas turbine engine (not shown) will receive a flow from the starting circuit. Just prior to or simultaneous with the firing of the burner, an air pressure signal 32 displaces the piston 22 of slug pump 4, causing a burst of fuel to be injected into the burner, facilitating the ignition of the fuel therein. When the accumulated fuel is discharged from the slug pump 4, the piston 108 of the pressurizing valve will be at its extreme lower limit of downward travel, thus not restricting the flow of fuel flowing therethrough.

After the ignition of the fuel in the burner, the gas producer (not shown) will commence rotating, initially under action of electric starter, which will drive the gear pump, thereby causing a flow in the main fuel supply line 18. Fuel will then flow through segment 14, passage 110, segment 16, and eventually be passed from the main metering valve section 134, at a pressure $P_M$ and flow rate $W_{fe}$ to the engine. Pressure $P_R$ will rise in accordance with increase in engine speed, and when the differential pressure $P_R-P_B$ is equal to about 10 p.s.i., the piston 108 will have moved upwardly against spring 120 a distance sufficient to allow fluid communication between segments 14 and 16 via notches 112 and 114 and hence effect a more gradual rise in in the pressure $P_R$ with a resulting increase in fuel flow. After a pressure differential $P_R-P_B$ equal to about 50 p.s.i. is achieved, the piston 108 will have moved upwardly to a position which will completely close off the starting circuit 10. At a differential pressure of about 200 p.s.i., projection 130 will come into contact with spring-biased member 122 and begin to regulate the pressure differential at 200 p.s.i. If conditions downstream cause $P_R$ to build up to a value which is above that pressure which the valve is designed to regulate, the piston 108 will move further in the upward direction and not effect a pressure regulation.

Obviously the constants of the springs 120 and 128 will dictate the value of the pressure $P_R$ at any given engine speed. It may be desirable to have $P_R$ at its maximum regulated value before 100 percent engine speed is reached, if high loads on the nozzle actuator 140 are anticipated before the gas producer has obtained full speed. Also, the values of the pressures recited heretofore are merely intended to be illustrative.

While the invention has been shown and described in its preferred embodiments, it will be clear to those skilled in the arts to which it pertains that many changes and modifications may be made thereto without departing from the scope or spirit of the invention.

I claim:

1. In a fuel control system, a main fuel supply line operatively associated with a main fuel pump for delivering a fuel flow through said line, and a metering section located in said main fuel supply line downstream of said pump, a starting circuit fluidly communicating with said main fuel supply line at locations upstream and downstream of said pump, and means to generate a fuel flow in said starting circuit, wherein the improvement comprises a pressurizing valve having a fluid connection with said starting circuit and said main fuel supply line, said fluid connection with said main fuel supply line being located intermediate said pump and said metering section, said pressurizing valve including means to regulate the pressure in said main fuel supply line and further including means responsive to a predetermined pressure in said main fuel supply line to close said starting circuit.

2. A fuel control system according to claim 1, in which said pressure-regulating means comprises a piston slideably mounted for axial movement in a housing, a lateral projection on said piston and a spring-biased member, adapted to be contacted by said projection, slideably mounted for axial movement in said housing.

3. A fuel control system according to claim 1, in which said pressure-responsive means comprises a spool, on the upper portion of said piston, and a helical compression spring operatively connected to said spool.

4. A fuel control system according to claim 1, in which the improvement further comprises means in fluid communication with said pressurizing valve responsive to a given signal to momentarily increase the rate of fuel flow in said starting circuit.

5. In a fuel control system, the combination comprising a main fuel supply line having an inlet and an outlet, a main fuel pump operatively connected to said supply line intermediate said inlet and said outlet to receive an inlet flow and produce a flow in said supply line, a starting circuit having an inlet segment and outlet segment, said inlet segment being connected to said supply line intermediate said inlet and said pump for receiving fuel therefrom, means to prevent a flow from said inlet segment to said outlet segment when the pressure differential across the pump exceeds a predetermined value and to subsequently regulate the pressure differential across the pump.

6. The combination, as defined in claim 5, in which said preventing and regulating means comprises a housing having an inlet port and an outlet port, said inlet and outlet ports being fluidly connected to said inlet and outlet segments, a piston mounted in said housing for axial sliding movement, said housing being located adjacent said supply line and said piston extending into said supply line dividing said supply line into a first segment and a second segment, said piston being movable to a position preventing communication between said inlet and outlet ports to thereby close said starting circuit, first spring means to bias said piston to a position in which said inlet and outlet ports are in communication and second spring means to permit said piston to regulate said pressure differential after closure of said starting circuit.

7. The combination, as defined in claim 6, in which said first spring means comprises a spool integral with said piston, an abutment on said spool, a first spring interposed between said abutment and said housing, and in which said second spring means comprises a member slideably mounted in said housing, a second spring interposed between said member and said housing, and a projection on said piston adapted to contact said member during movement of said piston.

8. The combination, as defined in claim 6, in which said piston includes a passage fluidly interconnecting said first and second segments of said supply line.

9. In a fuel control system, a main fuel supply line, a boost pump for supplying fuel to the inlet of the main fuel supply line, a main fuel pump operatively connected to said main fuel supply line for producing a fuel flow therein, a starting circuit having an inlet segment and an outlet segment for delivering a starting fuel flow, said inlet segment being connected to said main fuel supply line intermediate said boost pump and said main fuel pump for receiving fuel therefrom, a slug pump having a chamber therein, said chamber being operatively connected to said starting circuit for receiving flow from said inlet segment and accumulating a predetermined volume of fuel, a movable member mounted in the slug pump such that movement thereof reduces the volume of said chamber to expel the fuel therein accumulated and thereby momentarily increase the rate of flow in said outlet segment, a pressurizing valve operatively connected to said main fuel supply line for regulating the pressure therein and operatively connected said outlet segment, means fluidly interconnecting said chamber and said valve, and means to prevent a flow of fuel in said inlet segment during expulsion of said fuel from said chamber.

10. The combination, as defined in claim 9, in which said pressurizing valve comprises an outlet port connected to said outlet segment, said outlet port being in fluid communication with said interconnecting means, and means responsive to a sufficient pressure in said main fuel supply line to prevent fluid communication between said interconnecting means and said outlet port and thereby close said starting circuit.

11. The combination of claims 10, in which said pressure-responsive means includes a housing, a piston slideably mounted in the housing for axial movement therein and a helical compression spring operatively connected to said piston for biasing said piston.

12. The combination of claim 11, in which a member is slideably mounted for axial movement in said housing, another helical compression spring is operatively connected to said member for biasing said member, and a projection is integral with said piston, said projection being adapted to contact said member during axial movement of said piston.

13. The combination of claim 12, in which said piston has a passage passing therethrough and communicating with a face of said piston to fluidly interconnect two segments of said main fuel supply line.